Feb. 4, 1969   J. M. MENEFEE ET AL   3,426,195
SCINTILLATION COMPONENT FOR USE IN RADIATION DETECTION
DEVICES WHICH ARE SUBJECT TO WIDE
TEMPERATURE VARIATIONS
Filed March 10, 1966

JULIOUS M. MENEFEE & JOSEPH W. ERKER, INVENTORS.

BY *Dwight C Pond*

United States Patent Office 3,426,195
Patented Feb. 4, 1969

3,426,195
SCINTILLATION COMPONENT FOR USE IN RADIATION DETECTION DEVICES WHICH ARE SUBJECT TO WIDE TEMPERATURE VARIATIONS
Julious M. Menefee and Joseph W. Erker, Cleveland, Ohio, assignors to Kewanee Oil Company, Bryn Mawr, Pa., a corporation of Delaware
Filed Mar. 10, 1966, Ser. No. 533,153
U.S. Cl. 250—71.5     4 Claims
Int. Cl. G01t 1/20

ABSTRACT OF THE DISCLOSURE

A packaging of a scintillation crystal or crystals for use in radiation detection which is more rugged and resists physical or optical damage over wide temperature ranges which comprises a light tight metal container having its inner surface coated with a reflective material, the opening in such container consisting of a transparent window hermetically sealed to said container, the scintillation crystals in the container are surrounded by a normally liquid coupling material which in turn is surrounded by a core which is made up of hydrogenous materials such as Lucite, polyvinyl toluene and polystyrene, said core material being solid at normal operating conditions for the detector in which the scintillation component is used but which softens and becomes plastic at higher temperature so as to accommodate the expansion of the scintillation crystal.

---

Figure 2:
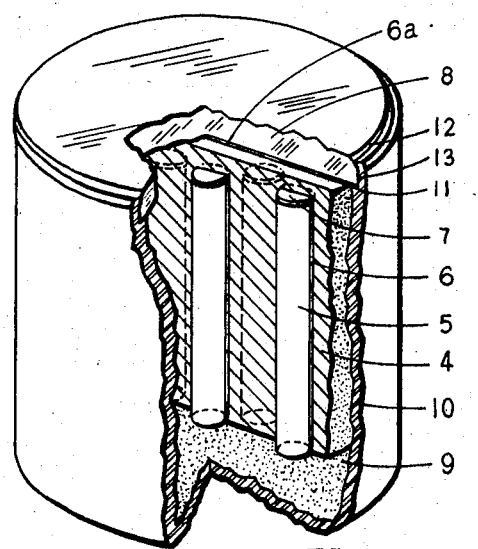

This invention relates to radiation detection apparatus and more particularly to novel scintillator components effective in neutron detectors to produce, with high efficiency, scintillations or flashes of light corresponding to neutrons of widely varying energy impinging on the scintillator.

In many fields of search and investigation, the detection of the presence of certain materials and the measurement of the quantity of the same may be effected by a determination of the characteristics of radiation emanating therefrom. A type of radiation frequently utilized in this manner is neutron radiation. In one type of detector for detecting neutrons, scintillation crystals are exposed to neutron radiation and in response thereto the crystals produce scintillations or flashes of light. The light may be directed onto the photoresponsive element of a photomultiplier tube which in turn produces electrical output signals corresponding to the neutron bombardment of the crystal. The electrical impulses may be used to supply suitable indicating apparatus for showing the amount of neutron radiation present.

The effective use of such neutron detectors requires a combination of several desirable qualities. The detector must be sensitive to low levels of radiation and be efficient and effective in producing output signals truly representative of the level of radiation present. In scintillation type detectors, this requires an efficient transfer of scintillation light from crystal to photomultiplier tube and a relatively high ratio of signal to "noise." In addition to a high optical efficiency and as a part of assuring the same, the detector must be hardy in being able to withstand physical shock and vibration, and must also be able to withstand relatively wide temperature variations because of the diverse environments in which such detection is performed. In present detectors, due to the differing coefficients of expansion of scintillation crystals and members to which these are attached, wide temperature variations of environments in which the detectors are employed cause severe strains at the interfaces often resulting in separation at such juncture. As a consequence, optical efficiency is reduced by optical contaminants, such as air occupying the space at such a separation, since such contaminants have indices of refraction which are not matched with the other optical elements of the system.

While it is important that a neutron detector be effective to detect the presence of low energy and low intensity neutrons, it is also important that at such low levels the detector produces a useful output signal which is not obscured by the presence of "noise." Such "noise" may be produced by extraneous radiation, such as gamma radiation and X-rays, or from electrical sources such as may occur in the photomultiplier tube itself, and being of a strength equal to a substantial fraction of the useful signal. Stated otherwise, it is important to maintain a high enough signal to "noise" ratio so that the output signal may be useful. In the case of neutron detectors wherein the presence of gamma rays produces "noise" output in the detector, the interfering effects of gamma rays and other "noise" producing radiation may be minimized by establishing a high ratio of neutrons absorbed to other types of radiation absorbed.

In many cases, it is also important that the detector be responsive to high as well as low energy radiation whether of high or low intensity. Since relatively high intensity neutrons are of decreased effect in producing scintillations, the energies of the neutrons are effectively reduced by the interposition of suitable hydrogenous materials in their paths. In many detectors utilizing this principle, the amount of hydrogenous material used is inadequate to sufficiently reduce the neutron energy and the size restrictions on the unit prevent the use of more hydrogenous material. However, a judicious geometrical relationship between scintillation crystal, optical elements, and hydrogenous material provides an increased efficiency and effectiveness in detecting high energy neutrons.

Accordingly, it is a principal object of this invention to facilitate an efficient optical coupling between scintillator element and a photoresponsive device in a neutron detector.

It is another object of this invention to effect a high signal-to-"noise" ratio in a neutron detector by maintaining a high ratio of neutrons absorbed to other types of radiation absorbed.

It is another object of this invention to provide a neutron scintillator element responsive to high as well as low energy neutrons to efficiently produce scintillations corresponding to neutron bombardment.

It is another object of this invention to provide a neutron scintillator component for neutron detectors which is physically hardy and durable, and able to withstand wide temperature variations without physical or optical damage.

It is still another object of this invention to provide a neutron scintillator component for neutron detectors which is inexpensive, simple in construction, and free from exterior contaminants.

In accordance with the foregoing objects of this invention, a scintillator component of a neutron detector is provided by the total encapsulation of a plurality of elongated scintillator crystals in an optically transparent, normally solid, hydrogenous core thus providing a unitary component. Optical coupling material in a normally liquid state is interposed between each crystal and the hydrogenous core. The core is provided with an adjacent window at one end but otherwise is enclosed in a metal container with an internal light reflector. The window and container are sealed to provide a sealed unit. The hydrogenous core is highly effective in reducing neutron energy to levels most effectively utilized in producing scintillations by the crystal and the total encapsulation of crystals in the core is effective in producing a highly efficient optical coupling from the crystals to the one end at which a window couples the scintillations to a photomultiplier tube. The optical coupling material and core material are interrelated so that are normally solid core becomes soft and plastic at increased temperatures at which the crystal and coupling material would otherwise expand and impose severe stresses on the crystal. Thus, damage to the detector is prevented. In order to assure uniformity of the light transfer efficiency, opaque optical reflectors are provided at the ends of the crystals near the optical window of the component whereby light produced in the crystals passes through the core before reaching the optical window.

Figure 1:
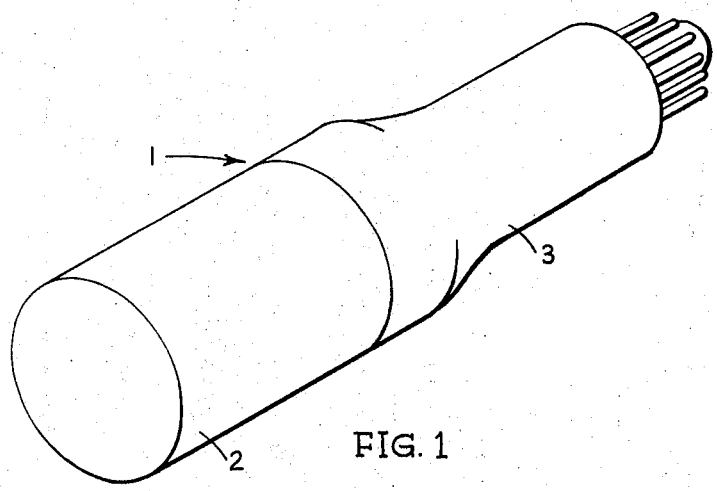

Other and further important objects and advantages of this invention will become apparent from a detailed description of a preferred embodiment thereof taken with the accompanying drawings in which:

FIG. 1 is a perspective view of a neutron detector according to this invention, and FIG. 2 is a perspective view, broken away, showing the detailed construction of the scintillator component of a neutron detector according to this invention.

In the drawings, 1 represents the neutron detector in its entirely and having as components, the scintillator component 2 and the photomultiplier tube 3. As shown in FIG. 1, the two components are held together in a position wherein a photoresponsive element of the photomultiplier tube is in a position to receive the maximum amount of light produced by scintillation in the scintillator component 2. The photomultiplier tube 3 may be of any suitable type wherein an electrical output signal is produced in response to scintillations projected onto the photoresponsive element of the tube.

Referring now to FIG. 2 for a detailed description of the scintillator component 2 of this invention, 4 designates the core portion of this unit and for convenience in manufacture and use is shown in the shape of a right circular cylinder although other geometric shapes thereof may readily be utilized. The core 4 is made of a transparent, hydrogenous material for the respective purposes of readily transmitting light and for effectively reducing the energy of neutrons passing through the same. Another requirement of the core material 4 is that the same be in a solid state at normal temperatures and plastic at somewhat elevated temperatures. Examples of materials from which the core 4 may be made include Lucite, polyvinyl toluene, and polystyrene.

The core 4 is provided with a relatively large number of spaced, longitudinal holes for accommodating scintillation crystals 5. Each of these crystals, which may be of lithium iodide or other suitable material capable of producing scintillations in response to neutron bombardment, is preferably elongated and extends along a large proportion of the length of core 4. As one feature of this invention, by the disposition of a relatively large number of small scintillation crystals in the core 4 in the manner shown, a relatively large ratio of crystal surface area to crystal volume is presented to impinging neutrons. Since the thermal and epithermal neutrons; that is, neutrons of low and intermediate energies, are absorbed after very small penetration into a scintillation crystal and "noise" producing radiations, such as gamma rays and X-rays, are very penetrating and thus, are not readily absorbed in the thin crystals, the scintillator component is particularly effective and efficient in response to neutron bombardment while being relatively unresponsive to "noise" radiation. Lower energy neutrons are readily absorbed by the scintillation crystals and the hydrogenous core is effective in slowing or reducing the energy of high energy neutrons to levels at which they are more readily absorbed by the scintillation crystals. Gamma radiation which frequently accompanies neutron radiation and is the preponderant source of "noise" in detection of neutron radiation has a minimal effect in the present detector.

Thus, an unusually high signal to "noise" ratio is achieved in the scintillation process itself.

Each crystal, of necessity, is of somewhat smaller cross-section than the corresponding hole in which it is disposed. The space between the walls of each hole and the crystal is for accommodating an optical coupling material 6. This material may be of one of a number of compositions having the properties of transparency, liquidity at the operating temperatures at which the component is operated, and preferably having an index of refraction intermediate to the indices of refraction of the core 4 and crystals 5. Also, the optical coupling material is preferably capable of being dried to remove substantially all of the water therefrom, thus to prevent the introduction of water into the finished scintillator component. Certain epoxy resins, silicon oil, silicon grease, and silicon rubber are satisfactory optical coupling materials and the extent of clearance between the crystal and core hole is affected by the viscosity of the coupling material which must be fluid enough to flow through this space on assembly of the unit by the insertion of the crystal into the hole after the optical coupling material has been introduced.

It is preferable that neutrons of the same energy but impinging upon different portions of the scintillator component produce substantially the same light output to indicate the energy character of the neutron rather than its position of impact. For maintaining a uniformity of light produced by the scintillator component in response to equal energy neutrons irrespective of the longitudinal position along the crystal from which a scintillation occurs, a reflective opaque member or cap 7 is positioned at one end of each scintillation crystal 5. A suitable material for such a cap is aluminum although other materials capable of blocking and reflecting light may readily be used. The caps 7 are preferably very thin but prevent direct light transfer from the scintillation crystal to an optical window 8. Light produced in the crystals and impinging upon the caps 7 is reflected back into the scintillator component and it is redirected through portions of the core toward window 8. In this manner, the light output of equal energy neutrons is made uniform irrespective of the longitudinal position of impact against the crystals 5.

For transmitting output light from the scintillator component 2, the window 8 is made of a transparent material having an index of refraction closely matching other optical elements of the system. To exclude moisture from within the scintillator component, the window preferably is of inorganic composition, such as glass, cadmium fluoride, or an appropriate ceramic, and is tightly secured and sealed against the core 4. Such seal is aided by a thin film of coupling material 6a spread on the adjacent surfaces between core 4 and window 8.

As another important feature of this invention, the optical coupling material 6 and 6a is liquid and provides a soft support for the scintillation crystals 5 which frequently are brittle and may be damaged by cracking when subjected to physical shock or vibration. Also, the crystals are inherently not tightly secured to the coupling material whereby a differential in expansion of the crystal and coupling material is readily accommodated without imposing damaging stresses on the crystal as may occur if the crystal is tightly secured to a solid member having a different coefficient of expansion. To further accommodate expansion of the crystals 5, so as to prevent damage thereto, the core material 4 is selected so as to become plastic or soft at greater temperatures at which the expansion of the crystals 5 would become dangerously great. Factors, such as the crystal dimensions, size of holes in which they are placed, and the expansion coefficients of materials are interrelated with the temperature of softening of core 4 so as to prevent any undue stress on the crystals. Thus, in its plastic or soft condition, the core readily yields to the expansion of the crystals and breakage of the crystals is prevented.

For maintaining a high efficiency and utilizing scintillation light to a maximum, a light reflector 9 surrounds the core 4 about its circular periphery and at the end removed from window 8 so as to prevent the escape of light along these peripheral portions. The light impinging on these portions is reflected back into the interior of the core 4 and either directly or after one or more reflections is directed out through window 8.

The entire scintillator unit 2 is enclosed in a container 10 which serves as a protective coating and may be of any material capable of providing a physical shield which is a low neutron absorber. Examples of satisfactory materials for container 10 are copper and stainless steel with the latter being preferred except in cases requiring especially low isotope contamination. The container 10 encloses the entire scintillator unit except for the window 8 and is provided with a circular shoulder 11 against which the window 8 is in abutment. For securing the window 8 into position against the core 4, it is chamfered along an outer portion 12 and the end of container 10 is inwardly crimped to form a lip 13 in tight contact with the chamber 12. A hermetic seal between window 8 and container 10 is provided as by tin solder in cases wherein window 8 is glass and by other metal to crystal or ceramic seals in other cases. A sealed unit preventing contaminants such as water vapor or dust is thus provided assuring a more effective and efficient operating unit.

It is thus seen from the foregoing description that a vastly improved scintillator component and neutron detector have been provided in accordance with this invention wherein a novel structure of simplicity and durability, facilitating improved, more efficient and uniform light output with a high signal to "noise" ratio in response to neutron radiation of high as well as low energy, is apparent. It will also be readily observed that the scintillator component of this invention may readily be constructed without time consuming, detailed machining or close tolerances.

Having thus described this invention in such full, clear, concise, and exact terms as to enable any person skilled in the art to which it pertains to make and use the same, and having set forth the best mode contemplated of carrying out this invention, the subject matter which is regarded as being the invention herein is particularly pointed out and distinctly claimed, it being understood that equivalents or modifications of, or substitutions for parts of the above specifically described embodiment of the invention may be made without departing from the true spirit and scope of the invention as set forth in the specification and in the appended claims.

The invention claimed is:

1. A rugged portable scintillation component capable of withstanding wide temperature variations without physical or optical damages comprising:
  (a) a light tight metal container having its internal surface coated with a light reflecting metal, said container having an opening therein for accommodating a window,
  (b) a transparent window sealing the opening in said container,
  (c) said container and said window together forming a sealed unit which completely encapsulates a core, said core consisting of a transparent hydrogenous material having at least one void therein, said transparent hydrogenous material, being solid at normal operating temperatures of the scintillation component, softens and becomes plastic at higher temperatures,
  (d) scintillation crystals being present in each void of the core,
  (e) each such scintillation crystal being surrounded by a transparent optical coupling material which is liquid at the operating temperatures of the scintillation component and fills the entire void between the core and the scintillation crystal so as to effect a complete optical coupling between said scintillation crystal and core, said softening of the core at elevated temperatures combined with the liquid nature of the optical coupling material prevents physical or optical damage to said scintillation crystals which would otherwise be caused by the expansion of said scintillation crystals at such elevated temperatures.

2. A scintillation component as stated in claim 1 wherein the scintillation crystals are elongated and extend substantially the length of the core and are arranged so that they are substantially perpendicular to said window.

3. A rugged portable scintillation component capable of withstanding wide temperature variations without physical or optical damages comprising:
  (a) a light tight metal container having its internal surface coated with a light reflecting metal, said container having an opening therein for accommodating a window,
  (b) a transparent window sealing the opening in said container,
  (c) said container and said window together forming a sealed unit which completely encapsulates a core, said core consisting of a transparent hydrogenous material selected from the group consisting of Lucite, polyvinyl toluene and polystyrene having one or more voids therein, said transparent hydrogenous material, being solid at normal operating temperatures of the scintillation component, softens and becomes plastic at higher temperatures,
  (d) scintillation crystals being present in each void of the core, said scintillation crystals having an opague light reflective member interposed between each such scintillation crystal and said window which prevents direct light transfer from the scintillation crystal to said window,
  (e) each such scintillation crystal being surrounded by a transparent optical coupling material which is liquid at the operating temperatures of the scintillation component and fills the entire void between the core and the scintillation crystal so as to effect a complete optical coupling between said scintillation crystal and core, said softening of the core at elevated temperatures combined with the liquid nature of the optical coupling material prevents physical or optical damage to said scintillation crystals which would otherwise be caused by the expansion of said scintillation crystals at such elevated temperatures.

4. A scintillation component as stated in claim 3 wherein the scintillation crystals are elongated and extend substantially the length of the core and are arranged so that they are substantially perpendicular to said window.

References Cited

UNITED STATES PATENTS 2,828,423  3/1958  Scherbatskoy _____ 250—71.5
3,288,996  11/1966  Monaghan _____ 250—71.5

RALPH G. NILSON, *Primary Examiner.*

SAUL ELBAUM, *Assistant Examiner.*

U.S. Cl. X.R.

250—83.1